US009739213B2

(12) United States Patent
Kemmerling et al.

(10) Patent No.: US 9,739,213 B2
(45) Date of Patent: Aug. 22, 2017

(54) METHODS FOR TURBOCHARGED ENGINE WITH CYLINDER DEACTIVATION AND VARIABLE VALVE TIMING

(71) Applicant: Ford Global Technologies, LLC, Dearborn, MI (US)

(72) Inventors: Joerg Kemmerling, Monschau (DE); Franz Arnd Sommerhoff, Aachen (DE); Andreas Kuske, Geulle (NL); Vanco Smiljanovski, Bedburg (DE); Helmut Matthias Kindl, Aachen (DE); Werner Willems, Aachen (DE); Claudia Katharina Herudek, Aachen (DE); Michael Forsting, Moenchengladbach (DE); Bas Lambertus van den Heuvel, Wijnandsrade (NL); Wilbert Hemink, Landgraaf (NL); Claudia Conee, Herzogenrath (DE); Richard Fritsche, Herzogenrath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 14/670,122

(22) Filed: Mar. 26, 2015

(65) Prior Publication Data

US 2015/0285163 A1    Oct. 8, 2015

(30) Foreign Application Priority Data

Apr. 4, 2014    (DE) ........................ 10 2014 206 510

(51) Int. Cl.
*F02D 17/02* (2006.01)
*F02D 13/02* (2006.01)
(Continued)

(52) U.S. Cl.
CPC ............ *F02D 17/02* (2013.01); *F02B 25/145* (2013.01); *F02B 37/001* (2013.01);
(Continued)

(58) Field of Classification Search
CPC .... F02B 25/145; F02B 37/001; F02B 37/002; F02B 37/007; F02B 37/22; F02D 13/0207;
(Continued)

(56) References Cited

U.S. PATENT DOCUMENTS

2003/0188535 A1* 10/2003 Mader ..................... F02B 37/12
60/612
2005/0039711 A1* 2/2005 Bryant ................ F02B 29/0412
123/90.15
(Continued)

FOREIGN PATENT DOCUMENTS

| DE | 10314583 A1 | 10/2003 | |
|---|---|---|---|
| DE | 102012210303 A1 | 12/2013 | |
| DE | 202014100426 U1 * | 3/2014 | ............ F02B 37/007 |

OTHER PUBLICATIONS

"Scavenging and Supercharging," archived as early as Dec. 9, 2000.*

*Primary Examiner* — Audrey K Bradley
(74) *Attorney, Agent, or Firm* — Julia Voutyras; McCoy Russell LLP (57) ABSTRACT

A system and methods are described for a turbocharged engine, comprising powering the engine using a first operating cylinder, supplementing the power using a second switchable cylinder, deactivating the second switchable cylinder responsive to a load below a first threshold, and closing a first shut-off valve downstream of a compressor during the partial deactivation to prevent a first turbocharger from imparting a delivery action into a second compressor during the partial deactivation. Embodiments are further (Continued)

described wherein a bypass line in a second exhaust line further serves as a short-circuit line to prevent the second compressor from imparting a delivery action against the closed first shut-off valve. A variable valve timing is then included to further optimize the combustion process during the partial deactivation.

11 Claims, 4 Drawing Sheets (51) Int. Cl.
F02D 13/06 (2006.01)
F02B 37/007 (2006.01)
F02B 37/22 (2006.01)
F02M 26/01 (2016.01)
F02M 26/08 (2016.01)
F02D 41/00 (2006.01)
F02B 25/14 (2006.01)
F02B 37/00 (2006.01)

(52) U.S. Cl.
CPC .......... *F02B 37/002* (2013.01); *F02B 37/007* (2013.01); *F02B 37/22* (2013.01); *F02D 13/0261* (2013.01); *F02D 13/0265* (2013.01); *F02D 13/06* (2013.01); *F02D 41/005* (2013.01); *F02D 41/0007* (2013.01); *F02D 41/0087* (2013.01); *F02M 26/01* (2016.02); *F02M 26/08* (2016.02); *F02D 13/0207* (2013.01); *F02D 13/0219* (2013.01); *F02D 2041/0012* (2013.01); *Y02T 10/144* (2013.01); *Y02T 10/18* (2013.01); *Y02T 10/47* (2013.01)

(58) Field of Classification Search
CPC ............. F02D 13/0219; F02D 13/0261; F02D 13/0265; F02D 13/06; F02D 17/02; F02D 41/0007; F02D 41/005; F02D 41/0087; F02D 2041/0012; F02M 26/01; F02M 26/08; Y02T 10/144; Y02T 10/18; Y02T 10/47
See application file for complete search history.

(56) References Cited

U.S. PATENT DOCUMENTS

2013/0019594 A1* 1/2013 Styles .................... F02M 26/38
60/605.2
2013/0333663 A1* 12/2013 Chen ...................... F02D 17/02
123/334

* cited by examiner

METHODS FOR TURBOCHARGED ENGINE WITH CYLINDER DEACTIVATION AND VARIABLE VALVE TIMING

CROSS REFERENCE TO RELATED APPLICATIONS

The present application claims priority to German Patent Application No. 102014206510.0, filed Apr. 4, 2014, the entire contents of which are hereby incorporated by reference for all purposes.

FIELD

The present description relates to methods for operating a supercharged engine having at least two cylinders and a partially variable valve drive.

BACKGROUND AND SUMMARY

Reducing fuel consumption of an internal combustion engine is one means to increase overall efficiency. Fuel consumption and thus efficiency pose a problem in particular in the case of Otto-cycle engines, or applied-ignition internal combustion engines. One option for optimizing the combustion process includes using a partially variable valve drive, perhaps in combination with direct fuel injection.

Valve drives are known in which both the lift of the valves and also the control timing are invariable. However, these parameters have an influence on the combustion process, and thus on fuel consumption, and can be varied to a greater or lesser extent by using variable valve drives. For example, if the closing time of the inlet valve and the inlet valve lift can be varied, the adjustments allowing for throttle-free and thus loss-free load control. The mixture mass or charge air mass which flows into the combustion chamber during the intake process is then controlled not by means of a throttle flap but rather by means of the inlet valve lift and the opening duration of the inlet valve. Variable valve drives are however expensive. A further approach to a solution for dethrottling an Otto-cycle engine is offered by cylinder deactivation, that is to say the deactivation of individual cylinders in certain load ranges.

One concept for reducing fuel consumption, also in the case of diesel engines, is cylinder deactivation, that is to say the deactivation of individual cylinders in certain load ranges. However, because in the case of constant engine power the deactivation of at least one cylinder of a multicylinder internal combustion engine increases the load on the other cylinders that are still operational, such that said cylinders operate in regions of higher loads, in which the specific fuel consumption is lower. The load collective in part-load operation of the diesel engine is shifted toward higher loads The inventors have recognized issues with such approaches and herein describe a system and methods for a turbocharged engine, comprising powering the engine using a first operating cylinder, supplementing the power using a second switchable cylinder, the second switchable cylinder switched based on load, the second switchable cylinder being deactivated responsive to a load below a first threshold and activated responsive to the load exceeding the first threshold, and closing a first shut-off valve downstream of a compressor during the partial deactivation.

In one exemplary embodiment, a bypass line is included in a second exhaust line along with a second shut-off element that is opened during the partial deactivation. In this way, the technical result is achieved that the compressor of the second exhaust-gas turbocharger is separated from the rest of the intake system, that is to say deactivated, during the partial deactivation, which prevents the first compressor of the first exhaust-gas turbocharger from imparting a delivery action into the second compressor during the partial deactivation. In addition, the bypass line further serves as a short-circuit line, which is included to eliminate a risk of the second compressor from imparting a delivery action against the closed first shut-off element when the overall intake line is closed. The cylinders which remain in operation during the partial deactivation furthermore exhibit enhanced mixture formation owing to the greater air mass or mixture mass supplied. Further advantages with regard to efficiency are attained in that a deactivated cylinder, owing to the absence of combustion, does not generate any wall heat losses owing to heat transfer from the combustion gases to the combustion chamber walls.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
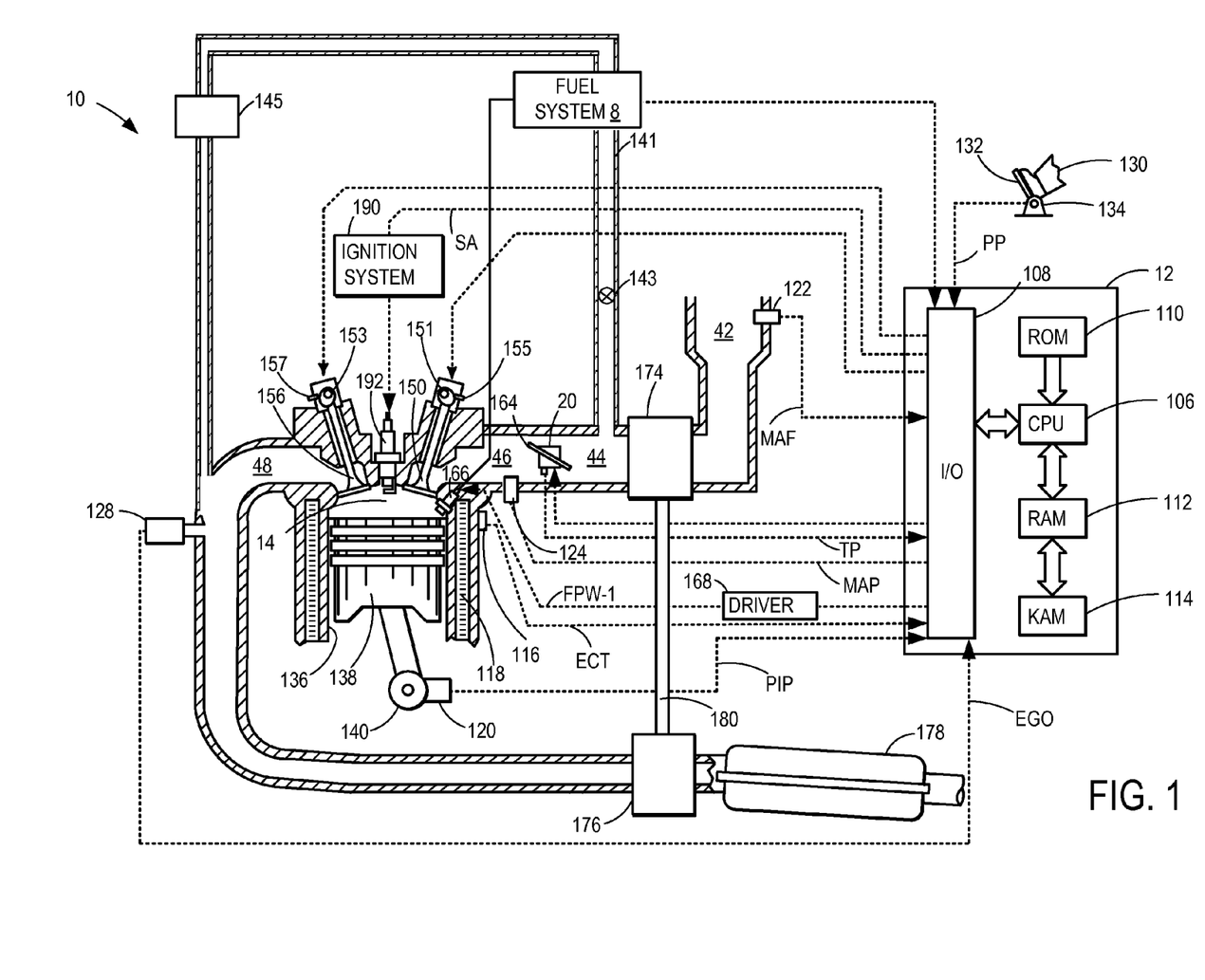
FIG. 1 shows an example embodiment of an engine according to the present disclosure.
Figure 2:
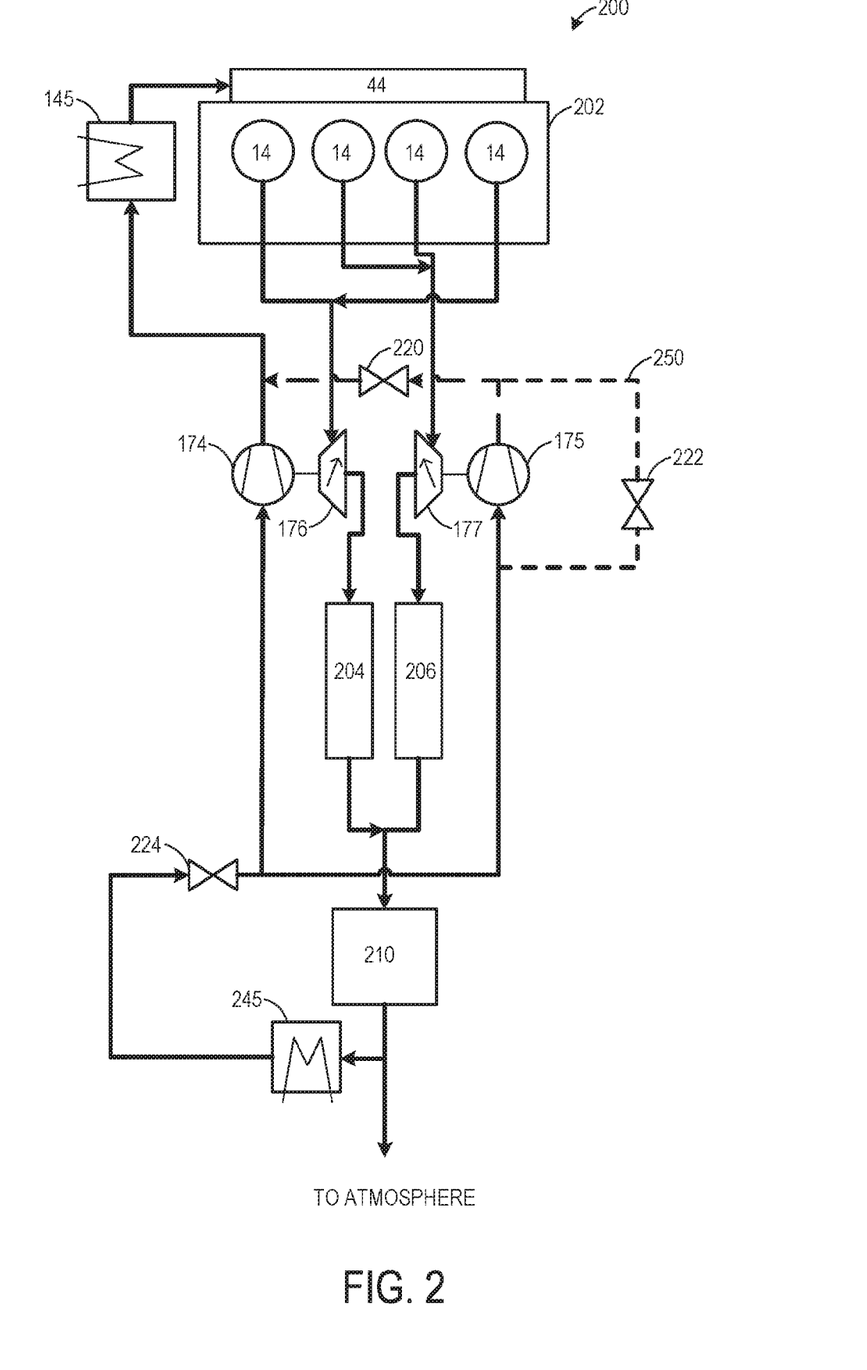
FIG. 2 depicts schematically an exemplary system to show possible airflow pathways.
Figure 3:
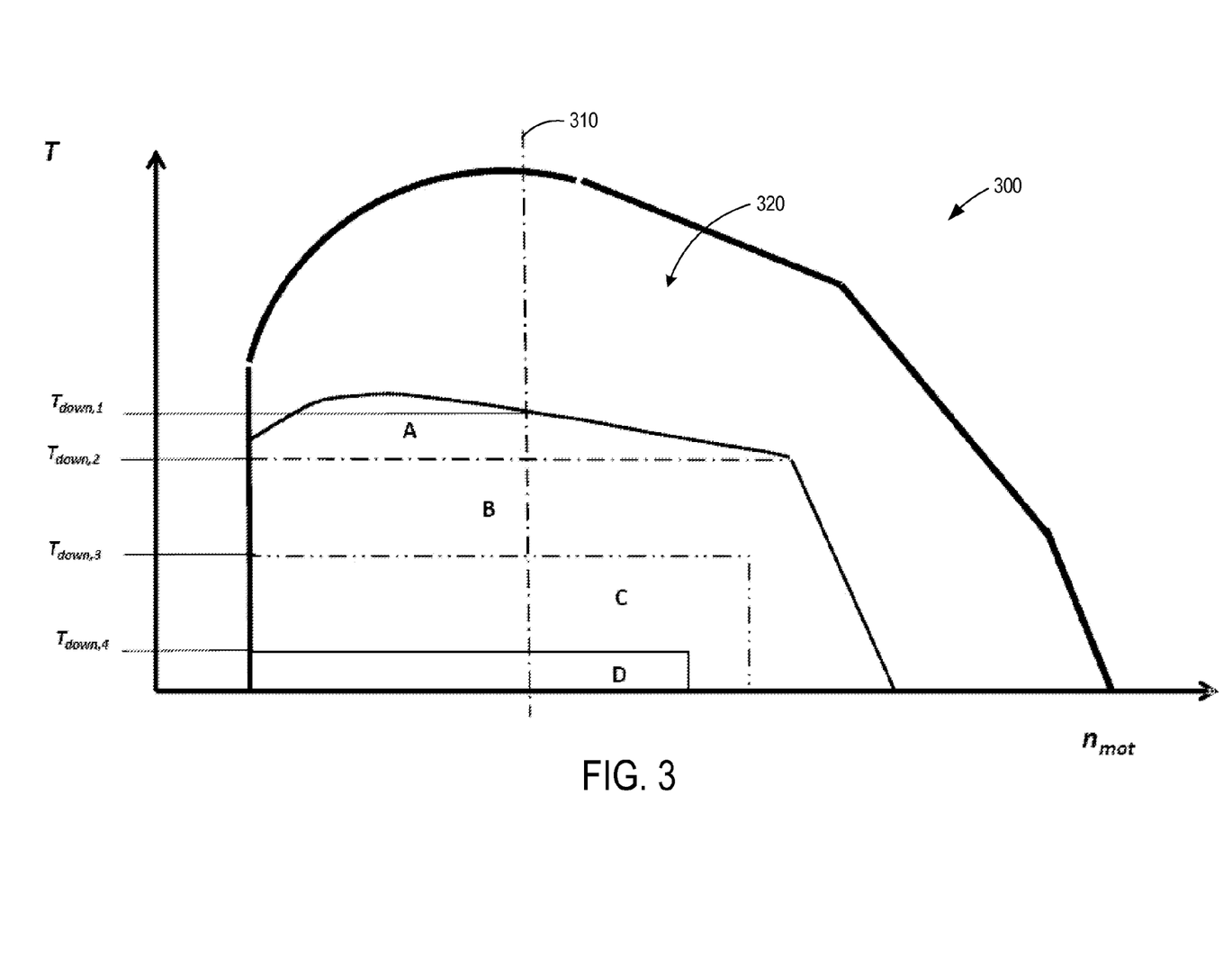
FIG. 3 schematically shows the characteristic map of a first embodiment of the supercharged auto-ignition internal combustion engine.
Figure 4:
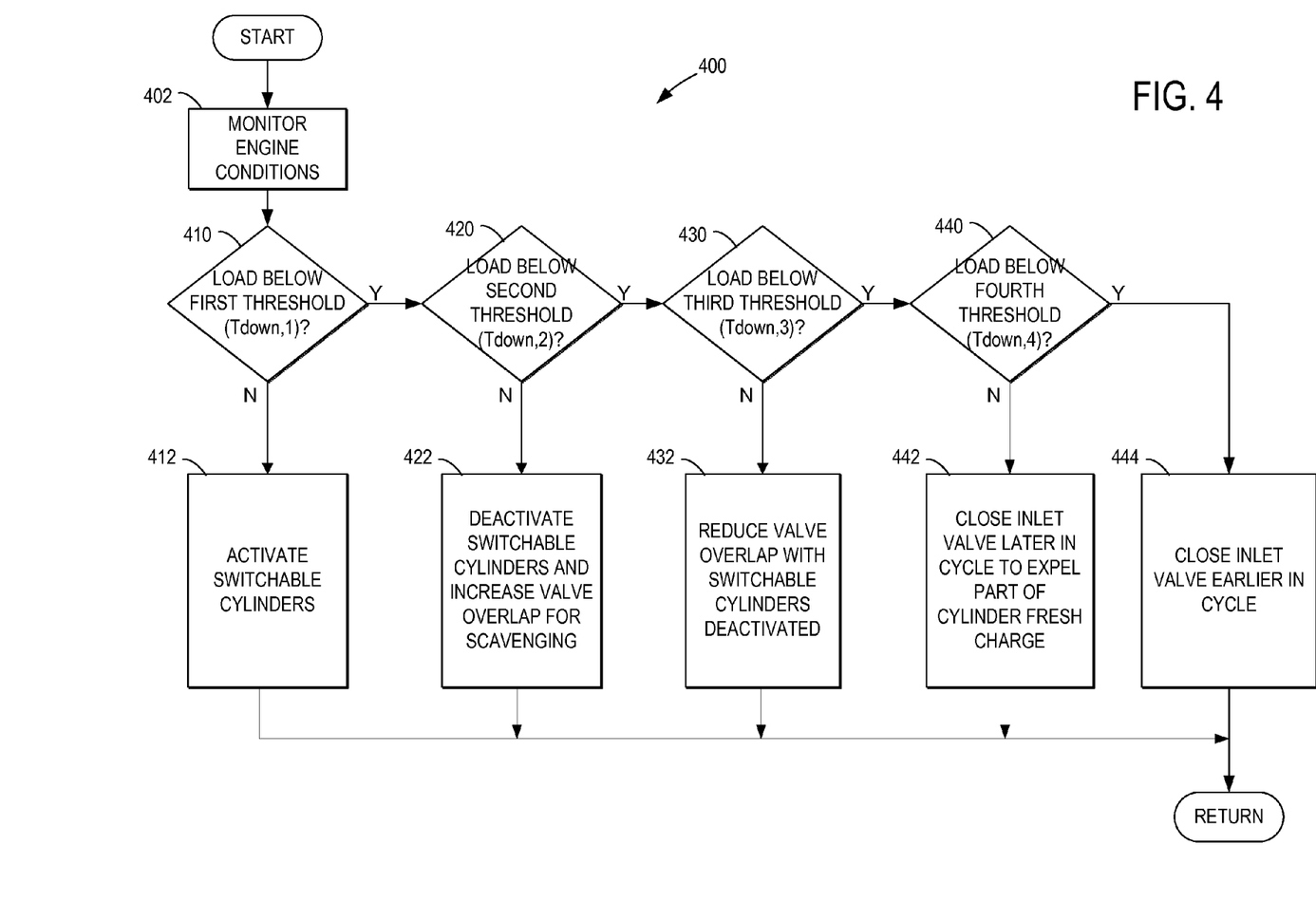
FIG. 4 is an example flow chart for switching between operating modes of the engine.

The present disclosure relates to a system and methods for operating a supercharged auto-ignition internal combustion engine having at least two cylinders and having at least one at least partially variable valve drive. For this reason, FIG. 1 shows an example embodiment of an engine according to the present disclosure. FIG. 2 further shows an exemplary four cylinder engine to depict possible airflow pathways within the system. FIG. 3 schematically shows the characteristic map of a first embodiment of the supercharged auto-ignition internal combustion engine while FIG. 4 is included to illustrate an exemplary flow chart for switching between operating modes of the engine. FIG. 5 is included to provide a simulated operating sequence according to the method of FIG. 4.

The present disclosure further relates to a method for operating a supercharged auto-ignition internal combustion engine having at least two cylinders and having at least one at least partially variable valve drive, in which each cylinder has at least one outlet opening which is adjoined by an exhaust line for discharging the exhaust gases via an exhaust-gas discharge system. As described herein, each cylinder has at least one inlet opening which is adjoined by an intake line for the supply of charge air via an intake system. According to the present disclosure, an engine comprises at least two cylinders configured in such a way that they form at least two groups, wherein each group further comprises at least one cylinder. The at least one cylinder of the first group is a cylinder which remains in operation even in the event of a partial deactivation of the internal combustion engine, whereas, the at least one cylinder of the second group is formed as a cylinder which can be switched in a load-dependent manner.

With regard to engine exhaust, the exhaust lines of the cylinders of each cylinder group merge separately to form an overall exhaust line such that an exhaust manifold is formed, and at least two exhaust-gas turbochargers are further provided, the turbine of a first exhaust-gas turbocharger being arranged in the first overall exhaust line of the first cylinder group and the turbine of a second exhaust-gas turbocharger being arranged in the second overall exhaust line of the second cylinder group, and the two associated compressors of the at least two exhaust-gas turbochargers being arranged in parallel in the intake system.

An internal combustion engine of the above-stated type is used as a motor vehicle drive unit. Within the context of the present disclosure, the expression "internal combustion engine" encompasses diesel engines and also hybrid internal combustion engines, which utilize a hybrid combustion process, and hybrid drives which comprise not only the internal combustion engine but also an electric machine which can be connected in terms of drive to the internal combustion engine and which receives power from the internal combustion engine or which, as a switchable auxiliary drive, additionally outputs power.

In the development of internal combustion engines, increased efficiency can be attained by minimizing fuel consumption. In this way, emphasis in the efforts being made is placed on obtaining an increased overall efficiency. Fuel consumption and thus efficiency pose a problem in particular in the case of Otto-cycle engines, that is to say in the case of applied-ignition internal combustion engines. One approach to a solution for dethrottling the Otto-cycle engine is for example an Otto-cycle engine operating process with direct injection. Another option for optimizing the combustion process of an Otto-cycle engine consists in the use of an at least partially variable valve drive. By contrast to conventional valve drives, in which both the lift of the valves and also the control timing are invariable, these parameters which have an influence on the combustion process, and thus on fuel consumption, can be varied to a greater or lesser extent by means of variable valve drives. If the closing time of the inlet valve and the inlet valve lift can be varied, this alone makes throttling-free and thus loss-free load control possible. The mixture mass or charge air mass which flows into the combustion chamber during the intake process is then controlled not by means of a throttle flap but rather by means of the inlet valve lift and the opening duration of the inlet valve. Variable valve drives are however expensive. A further approach to a solution for dethrottling an Otto-cycle engine is offered by cylinder deactivation, that is to say the deactivation of individual cylinders in certain load ranges.

Even though diesel engines, that is to say auto-ignition internal combustion engines, owing to the quality regulation on which they are based, exhibit greater efficiency, that is to say lower fuel consumption, than Otto-cycle engines in which the load is adjusted by means of throttling or quantity regulation with regard to the charge of the cylinders, there is, even in the case of diesel engines, potential for advancement and a demand for advancement with regard to fuel consumption and efficiency.

In the case of diesel engines, one concept for reducing fuel consumption is also cylinder deactivation, that is to say the deactivation of individual cylinders in certain load ranges. The efficiency of the diesel engine in part-load operation can be increased, that is to say increased, by means of a partial deactivation, because in the case of constant engine power the deactivation of at least one cylinder of a multi-cylinder internal combustion engine increases the load on the other cylinders that are still operational, such that said cylinders operate in regions of higher loads, in which the specific fuel consumption is lower. The load collective in part-load operation of the diesel engine is shifted toward higher loads.

The cylinders which remain in operation during the partial deactivation furthermore exhibit enhanced mixture formation owing to the greater air mass or mixture mass supplied. Further advantages with regard to efficiency are attained in that a deactivated cylinder, owing to the absence of combustion, does not generate any wall heat losses owing to heat transfer from the combustion gases to the combustion chamber walls.

In the case of diesel engines, the partial deactivation is also intended to prevent the fuel-air mixture from becoming too lean as part of the quality regulation in the event of decreasing load as a result of a reduction of the fuel quantity used. The internal combustion engine according to the present disclosure is also an internal combustion engine suitable for partial deactivation, that is to say an internal combustion engine with at least one deactivatable cylinder.

The multi-cylinder internal combustion engines with partial deactivation described in the prior art, and the associated methods for operating said internal combustion engines, have considerable potential for enhancement, as will be explained briefly below.

If, for the purpose of the partial deactivation, the fuel supply to the deactivatable cylinders is stopped, that is to say discontinued, the deactivated cylinders continue to participate in the charge exchange if the associated valve drive of said cylinders is not deactivated or cannot be deactivated. The charge exchange losses thus generated by the deactivated cylinders lessen, and counteract, the enhancements achieved with regard to fuel consumption and efficiency by means of the partial deactivation, such that the benefit of the partial deactivation is at least partially lost, that is to say the partial deactivation in fact yields an altogether less pronounced enhancement. Against the background of that stated above, it is the object of the present disclosure to specify a method by means of which the operating behavior or efficiency of the auto-ignition internal combustion engine during partial deactivation is increased.

Referring now to FIG. 1, an example embodiment of a combustion chamber or cylinder of internal combustion engine 10 is shown. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 42, 44, and 46. Intake air passage 46 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 42 and 44, and an exhaust turbine 176 arranged along exhaust passage 48. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle valve 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174. For a charged internal combustion engine, a charge cooler 145 is often arranged in an intake manifold which lowers the temperature of the aspirated charge air or fresh air and thereby increases the density of the fresh cylinder charge. In this way the charge air cooler 145 contributes to increased filling of the combustion chamber with charge air.

Exhaust passage 48 may receive exhaust gases from other cylinders of engine 10 in addition to cylinder 14. Exhaust gas sensor 128 is shown coupled to exhaust passage 48 upstream of emission control device 178. Gas sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow and/or a direct injection of a knock control fluid, thereby reducing EGR transients and improving engine performance.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock control fluid thereto. In some embodiments, the knock control fluid may be a fuel, wherein the injector is also referred to as a fuel injector. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while in one embodiment, the engine may be operated by injecting the variable fuel or knock control fluid blend via a single direct injector; in alternate embodiments, the engine may be operated by using two injectors (a direct injector 166 and a port injector) and varying a relative amount of injection from each injector.

Fuel may be delivered by the injector to the cylinder during a single cycle of the cylinder. Further, the distribution and/or relative amount of fuel or knock control fluid delivered from the injector may vary with operating conditions, such as aircharge temperature, as described herein below. Furthermore, for a single combustion event, multiple injections of the delivered fuel may be performed per cycle. The multiple injections may be performed during the compression stroke, intake stroke, or any appropriate combination thereof.

As described above, FIG. 1 shows one cylinder of a multi-cylinder engine. As such each cylinder may similarly include its own set of intake/exhaust valves, fuel injector(s), spark plug, etc.

One option for increasing the efficiency of auto-ignition internal combustion engine during partial deactivation is achieved by means of a method for operating a supercharged auto-ignition internal combustion engine having at least two cylinders and having at least one at least partially variable valve drive, in which each cylinder has at least one outlet opening which is adjoined by an exhaust line for discharging the exhaust gases via an exhaust-gas discharge system. Therein, each cylinder has at least one inlet opening which is adjoined by an intake line for the supply of charge air via an intake system, at least two cylinders are configured in such a way that they form at least two groups with in each case at least one cylinder, wherein the at least one cylinder of a first group is a cylinder which is in operation even in the event of a partial deactivation of the internal combustion engine, and the at least one cylinder of a second group is formed as a cylinder which can be switched in a load-dependent manner, the exhaust lines of the cylinders of each cylinder group merge in each case to form an overall exhaust line such that an exhaust manifold is formed, and at least two exhaust-gas turbochargers are provided. The turbine of a first exhaust-gas turbocharger is further arranged in the first overall exhaust line of the first cylinder group and the turbine of a second exhaust-gas turbocharger arranged in the second overall exhaust line of the second cylinder group, and the two associated compressors of the at least two exhaust-gas turbochargers being arranged in parallel in the intake system. The system includes at least one switchable cylinder, wherein the switchable cylinder of the second group is switched as a function of the load T of the internal combustion engine, in such a way that said at least one switchable cylinder is deactivated, during a reduction in load, if a first predefinable load $T_{down,1}$ is undershot, and is activated if a predefinable load $T_{up}$ is exceeded.

Predetermined threshold loads $T_{down}$ and $T_{up}$ for the undershooting and exceedance respectively may be of equal magnitude in some instances. Herein, for simplicity, the predetermined threshold loads are of equal magnitude. However, $T_{down}$ and $T_{up}$ may also differ in magnitude. When the internal combustion engine is in operation, the cylinders of the first cylinder group are cylinders which are permanently in operation. Switching of the second cylinder group, that is to say an activation and deactivation of said second group, takes place. Furthermore, the predefined limit loads may be varied and predefined as a function of the engine speed, the coolant temperature, the charge pressure and/or at least one further operating parameter.

The internal combustion engine on which the methods according to the description are based is equipped with at least two exhaust-gas turbochargers. The turbines of the at least two exhaust-gas turbochargers are arranged in parallel in the exhaust-gas discharge system, with each cylinder group being assigned a turbine. This yields a considerable enhancement in supercharging behavior, that is to say in the torque characteristic of the internal combustion engine, in particular during partial deactivation.

Each turbine can be configured for the exhaust-gas flow rate of the associated cylinder group, that is to say for the number of cylinders of the respective group. Then, if the at least one deactivatable cylinder of the second group is deactivated during partial deactivation, this no longer necessarily has an influence on the exhaust-gas flow rate conducted through the turbine of the first group, as a result of which the turbine pressure ratio of said first turbine does not necessarily decrease. The charge pressure ratio does not decrease, and sufficient charge air is supplied to the cylinders that remain in operation.

In some instances, the supply of charge air to the deactivated cylinders may be stopped or reduced, and the compressor of the second exhaust-gas turbocharger may be deactivated, for example separated from the rest of the intake system by means of a shut-off element referred to as the first shut-off element, during the partial deactivation.

The turbines according to the present disclosure of the at least two exhaust-gas turbochargers are of smaller dimensions because each turbine has to supply charge air not to all of the cylinders but only to the cylinders of one group. The relatively small rotor of the turbines results in lower inertia, whereby, in particular, the response behavior of the associated exhaust-gas turbocharger, and ultimately of the internal combustion engine, is increased. That is to say, the turbochargers are more responsive to changing conditions in the exhaust system. This offers advantages in particular if the turbine assigned to the second cylinder group has to be accelerated again after the partial deactivation comes to an end.

Although the auto-ignition internal combustion engine has at least two cylinders or at least two groups with in each case at least one cylinder, internal combustion engines with three cylinders which are configured in three groups with in each case one cylinder, or internal combustion engines with six cylinders which are configured in three groups with in each case two cylinders, are likewise internal combustion engines configured to be operated in accordance with the methods according to the disclosure. It is then the case that the exhaust lines of the cylinders merge to form three overall exhaust lines, thus forming three exhaust manifolds, wherein three exhaust-gas turbochargers are provided and a respective turbine of an exhaust-gas turbocharger is arranged in one overall exhaust line of one cylinder group.

Within the context of a partial deactivation, the three cylinder groups may be activated or deactivated in succession, whereby two-time switching may also be realized. The partial deactivation is thereby further optimized. The cylinder groups may also comprise a different number of cylinders, for example may form one group with one cylinder and one group with two cylinders in the case of a three-cylinder engine.

FIG. 2 depicts schematically an exemplary four cylinder engine system 200 to show possible airflow pathways according to the present disclosure. Thus, as described herein, the turbocharged engine comprises at least two cylinders arranged into two groups, wherein a first group of cylinders is configured to operate during a partial deactivation, a second group of cylinders is configured for adjustment based on an engine load, and exhaust lines extending separately from the two groups of cylinders. The exhaust lines from each cylinder group merge to form overall exhaust lines connecting separately to two turbochargers, wherein a first turbocharger is arranged in the first overall exhaust line of the first cylinder group, a second turbocharger is arranged in the second overall exhaust line of the second cylinder group. The compressors of the first and second turbochargers are arranged in parallel, and a first shut-off element is arranged in the second overall exhaust line downstream of the compressor of the second turbocharger, the first shut-off element being closed during the partial deactivation.

In the embodiment of FIG. 2, the engine further comprises a bypass line in the second overall exhaust line. The bypass line includes a second shut-off element that is opened during the partial deactivation to prevent the compressor of the second turbocharger from imparting a delivery action against the closed first shut-off element. Thus, method variants for operating a supercharged auto-ignition internal combustion engine in which the intake system comprises at least two overall intake lines, wherein the compressor, arranged in the second overall intake line, of the second exhaust-gas turbocharger is equipped with a bypass line in which a further shut-off element referred to as the second shut-off element is arranged are advantageous in which the second shut-off element is opened during a partial deactivation. The bypass line then serves as a short-circuit line, thus eliminating the risk of the second compressor imparting a delivery action against the closed first shut-off element when the overall intake line is closed off downstream. An engine according to the present description further comprises a partially variable valve drive configured to adjust one or more of a valve lift and valve timing.

Therein, engine block 202 is shown including four cylinders 14. As described above with respect to FIG. 1, intake passage 44 is shown schematically. As one example, engine block 202 includes two cylinder groups leading separately to two turbochargers downstream in the exhaust airflow. Herein, the first group of operating cylinders comprise the outer cylinders while the second group of switchable cylinders comprise the inner cylinders.

As shown, the first group of operating cylinders lead separately and merge before flowing into the first turbocharger comprising, e.g., turbine 176 and compressor 174. Compressor 174 may be at least partially powered by exhaust turbine 176 via a shaft where the boosting device is configured as a turbocharger. Alternatively, the second group of switchable cylinders lead separately and merge before flowing into the second turbocharger comprising, e.g., second turbine 177 and second compressor 175. Second compressor 175 may be at least partially powered by exhaust turbine 177 via a shaft where the boosting device is configured as a turbocharger.

First diesel oxidation catalyst 204 and second diesel oxidation catalyst 206 are further included within each flow pathway, respectively, downstream of each turbocharger. After flowing through the catalysts, the exhaust flows may further merge into an overall exhaust flow that is processed by a diesel particulate filter 210 (DPF), which may also be a lean NOx trap in some instances. Thereafter, the exhaust flow may exit the vehicle for distribution to the atmosphere.

A vehicle configured according to the present description includes exhaust gas recirculation. Thus, FIG. 2 is shown including schematic pathways that lead from the exhaust system back to intake passage 44. In FIG. 2, the system is a low-pressure EGR. However, the system may also be a high-pressure EGR as described above with respect to FIG. 1.

For this reason a recirculation pathway is shown downstream of DPF 210 leading back to intake passage 44. According to the descriptions provided, the EGR passage, e.g., EGR passage 141 of FIG. 1 may further include two flow pathways. In some instances, a EGR cooler 245 may be included to cool the recirculated exhaust gases delivered back into intake passage 44. EGR valve 224 is also included that provides for shutting off the exhaust gas recirculation. Thereafter, the recirculated exhaust flow may split into the two pathways depending on the on/off state of the additional valves included therein. In some instances, an additional EGR cooler may also or alternatively be included downstream of the compressors and upstream of intake passage 44.

When the engine load exceeds the first threshold, the may be operated with or without EGR via both recirculation pathways. As described herein, the EGR recirculation via the pathways shown is referred to as external EGR. External EGR is via a valve, or an EGR valve. External EGR allows exhaust gases to enter the combustion chamber in order to reduce peak temperatures and/or to reduce NOx emissions. The present disclosure further allows for internal EGR in some operating modes. Internal EGR uses the valve overlap period to regulate the extent that exhaust gas remains in the cylinder during the combustion process. Internal EGR may be used in engines with variable valve timing.

The second recirculation pathway returning to intake passage 44 includes first shut-off element 220. As noted above, the first shut-off element downstream of second compressor 175 that is closed during the partial deactivation. Bypass line 250 is further included along with second shut-off element 222. As noted above, the bypass line serves as a short-circuit line that eliminates a risk of the second compressor imparting a delivery action against the closed first shut-off element when the overall intake line is closed.

In this way, embodiments of the method are advantageous in which, in the event of the predefined load $T_{down,1}$ being undershot, the at least one cylinder that is operational even during partial deactivation of the internal combustion engine is initially, in accordance with a first operating mode for scavenging purposes, operated with an increased valve overlap for the purpose of scavenging out residual gas and improving the charging of the cylinder with charge air.

The scavenging-out of residual gas makes it possible for a greater quantity of charge air to be introduced during the charge exchange for the subsequent working cycle, thus permitting an enhancement in the charging of the cylinder with fresh mixture. In this way, the torque is increased, and the torque characteristic of the internal combustion engine during partial deactivation is significantly enhanced.

Embodiments of the method may also be advantageous in which, in the event of the predefined load $T_{down,1}$ being undershot, the at least one cylinder that is operational even during partial deactivation of the internal combustion engine is initially operated in accordance with a first operating mode, in which an inlet valve of the at least one inlet opening of the at least one cylinder is actuated such that said inlet valve performs an additional valve lift before top dead center is reached during the course of the charge exchange and before the inlet valve performs the maximum valve lift during the course of the charge exchange.

Like the measure described above, an additional input-side valve lift also leads to more effective scavenging-out of residual gas and thus to an increase in torque and thus to an enhancement in the torque characteristic of the internal combustion engine during partial deactivation.

In this connection, embodiments of the method are advantageous in which, in the first operating mode, exhaust gas is circulated externally. Exhaust-gas recirculation, that is to say the recirculation of combustion gases, is a suitable means for reducing the nitrogen oxide emissions, wherein it is possible for the nitrogen oxide emissions to be considerably reduced with increasing exhaust-gas recirculation rate. Here, the exhaust-gas recirculation rate $x_{EGR}$ is determined as $x_{EGR}=m_{EGR}/(m_{EGR}+m_{fresh\ air})$, where $m_{EGR}$ denotes the mass of recirculated exhaust gas and $m_{fresh\ air}$ denotes the supplied fresh air which is conducted through the compressor and compressed. To achieve a significant reduction in nitrogen oxide emissions, high exhaust-gas recirculation rates may occur.

In this case, method variants are advantageous in which exhaust gas is branched off from the exhaust-gas discharge system upstream of a turbine and introduced into the intake system downstream of a compressor, preferably branched off from the exhaust-gas discharge system upstream of the first turbine and introduced into the intake system downstream of the first compressor.

In the case of said so-called high-pressure EGR, the exhaust gas is extracted from the exhaust-gas discharge system upstream of a turbine and is fed into the intake system downstream of a compressor, whereby the exhaust gas may not be subjected to exhaust-gas aftertreatment, in particular supplied to a particle filter, before being recirculated, because there is no risk of fouling of a compressor.

In the case of the operation of an internal combustion engine with exhaust-gas turbocharging and the simultaneous use of high-pressure EGR, a conflict may however arise because the recirculated exhaust gas is no longer available for driving the turbine. In the event of an increase in the exhaust-gas recirculation rate, the exhaust-gas flow introduced into the turbine decreases. The reduced exhaust-gas mass flow through the turbine leads to a lower turbine pressure ratio, as a result of which the charge-pressure ratio also falls, which equates to a smaller charge-air flow. One solution to this is so-called low-pressure EGR. By contrast to high-pressure EGR, in the case of low-pressure EGR, exhaust gas which has already flowed through a turbine is introduced into the intake system. For this purpose, the low-pressure EGR arrangement has a recirculation line which branches off from the exhaust-gas discharge system downstream of a turbine and issues into the intake system upstream of a compressor.

The exhaust gas which is recirculated via the low-pressure EGR arrangement to the inlet side is mixed with fresh air upstream of a compressor. The mixture of fresh air and recirculated exhaust gas produced in this way forms the charge air which is supplied to the compressor and compressed.

Since, within the low-pressure EGR arrangement, exhaust gas is conducted through the compressor, said exhaust gas is previously subjected to exhaust-gas aftertreatment, in particular in a particle filter such as DPF 210. Depositions in the compressor which change the geometry of the compressor, in particular the flow cross sections, and thereby impair the efficiency of the compressor, are desired to be prevented.

FIG. 3 schematically shows the characteristic map 300 of a first embodiment of the supercharged auto-ignition internal combustion engine. Speed ($n_{mot}$) is shown plotted on the x-axis and torque (T) is shown plotted on the y-axis. Characteristic map 300 includes the various load threshold described herein that are used to create the regions indicated and described. Speed profile 310 is included to simplify the description of the methods as load is decreased following the profile provided. In other words, when a load is reduced at a constant speed, the regions A, B, C, and D may be encroached upon as the load is decreased. Regions A, B, C, and D indicate the first, second, third, and fourth operating modes of the engine described. As described herein, the operating modes apply to part load operations wherein the engine is partially deactivated.

At loads above the first threshold $T_{down,1}$ along speed profile 310, fully active region 320 is included to illustrate the region wherein the engine is operating using all cylinders. Thus, in this region, the turbocharged engine comprises powering the engine using a first operating cylinder, and supplementing the power using a second switchable cylinder. Although not shown, fully active region 320 may further include regions wherein the fully active engine operating using all cylinders includes exhaust-gas recirculation.

In the event of a first predefinable load $T_{down,1}$ being undershot, partial deactivation of the internal combustion engine is performed, specifically such that at least one switchable cylinder of the second group is deactivated in the event of said first predefinable load $T_{down,1}$ being undershot. In other words, as the load is decreased following speed profile 310, at loads below the first threshold $T_{down,1}$, the second switchable cylinder may be deactivated responsive to the reduced load. The second switchable cylinder is thus adjusted based on load, the second switchable cylinder being deactivated responsive to a load below a first threshold and activated responsive to the load exceeding the first threshold.

For the operation of a supercharged auto-ignition internal combustion engine in which the intake system comprises at least two overall intake lines and a shut-off element is arranged in the second overall intake line downstream of the compressor of the second exhaust-gas turbocharger, method variants are advantageous in which the shut-off element is closed during a partial deactivation. By closing the shut-off element, the compressor of the second exhaust-gas turbocharger is separated from the rest of the intake system, that is to say deactivated, during the partial deactivation, such that in particular, a situation is prevented in which the first compressor of the first exhaust-gas turbocharger imparts a delivery action into the second compressor during the partial deactivation and the charge pressure of the at least one cylinder that is operational even during partial deactivation of the internal combustion engine decreases.

Proceeding from this first operating mode A, the at least one cylinder that is operational even during partial deactivation of the internal combustion engine is switched, in the event of a further reduction in load and a second predefinable load $T_{down,2}$ being undershot, to a second operating mode B with external exhaust-gas recirculation. In this case, the valve overlap is reduced. Said differently, as the load is further decreased following speed profile 310, at loads below the second threshold $T_{down,2}$, adjustments may be made to reduce valve overlap during the partial deactivation responsive to the load falling below a second threshold. As described herein, the second threshold is lower than the first threshold.

Proceeding from this second operating mode B, the at least one cylinder that is operational even during partial deactivation of the internal combustion engine is switched, in the event of a further reduction in load and a third predefinable load $T_{down,3}$ being undershot, to a third operating mode C in which the at least one operational cylinder, during the course of a charge exchange, is, in accordance with the Atkinson cycle, closed later at the inlet side in order to expel a part of the cylinder fresh charge introduced during the course of the charge exchange. Said differently, as the load is further decreased following speed profile 310, at loads below the third threshold $T_{down,3}$, adjustments may be made to close an inlet valve later during charge exchange to expel part of a cylinder fresh charge responsive to the load falling below the third threshold. As described herein, the third threshold is lower than both the first and second thresholds.

Proceeding from this third operating mode C, the at least one cylinder that is operational even during partial deactivation of the internal combustion engine is switched, in the event of a further reduction in load and a fourth predefinable load $T_{down,4}$ being undershot, to a fourth operating mode D in which the at least one operational cylinder, during the course of a charge exchange, is closed earlier at the inlet side. Said differently, as the load is further decreased following speed profile 310, at loads below the fourth threshold $T_{down,4}$, adjustments may be made to close the inlet valve earlier during charge exchange responsive to the load falling below the fourth threshold. Herein, the fourth threshold is lower than the first, second, and third thresholds.

Turning now to a description of adjusting the operating mode, FIG. 4 is an example flow chart or method 400 for switching between operating modes of the engine. The methods described herein provide for optimizing partial load operations in an engine with cylinders configured for deactivation At 402, method 400 includes monitoring engine conditions to determine when the conditions are right for adjusting operations. For example, switching of the second cylinder group, that is to say an activation and deactivation of said second group, may take place based on a load of the engine. Furthermore, the predefined loads may be varied and predefined as a function of the engine speed, the coolant temperature, the charge pressure and/or at least one further operating parameter that are monitored during engine operations. For simplicity, the description herein is provided in terms of a decreasing engine load.

At 410, method 400 includes determining whether a load on the engine falls below the first threshold. If the engine does not fall below the predetermined first threshold, for example, because a load on the engine exceeds the predetermined first threshold, the method for optimizing partial load operations in an engine with cylinders configured for deactivation comprises operating the engine in a first operating mode by powering the engine with a first group of operating cylinders and supplementing the power with a second group of switchable cylinders by activating the switchable cylinders, as shown at 412 (e.g., as shown at fully active region 320 of FIG. 3).

At 420, method 400 further includes determining whether a load on the engine falls below the second threshold. If the engine falls below the predetermined first threshold but exceeds the predetermined second threshold, at 422, method 400 includes deactivating the switchable cylinders and increasing the valve overlap of the first operating cylinder for scavenging out residual gas and enhancing the charging of the cylinder with charge air. Upon deactivating the switchable cylinders, the method may further comprise closing the first shut-off element and/or opening a second shut-off element in a bypass line during the partial deactivation.

In some embodiments, the method may further comprise actuating an inlet valve of the first operating cylinder to provide an additional valve lift before top dead center during charge exchange, wherein exhaust gas may be recirculated externally during operations.

Embodiments of the method are advantageous in which, proceeding from the first operating mode of the at least one cylinder that is operational even during partial deactivation of the internal combustion engine, in the event of a further reduction in load and a second predefinable load $T_{down,2}$ being undershot, a switch is made to a second operating mode with external exhaust-gas recirculation by virtue of the valve overlap being reduced. At 430, method 400 further includes determining whether a load on the engine falls below the third threshold. If the engine falls below the predetermined second threshold but exceeds the predetermined third threshold, at 432, method 400 includes reducing the valve overlap during the partial deactivation responsive to the load falling below a second threshold that is lower than the first threshold. In the way, the method includes operating the engine in a second operating mode by reducing valve overlap of the first group of operating cylinders with exhaust gas recirculation responsive to the load falling below a second threshold.

In this context, embodiments of the method are advantageous in which, proceeding from the second operating mode of the at least one cylinder that is operational even during partial deactivation of the internal combustion engine, in the event of a further reduction in load and a third predefinable load $T_{down,3}$ being undershot, a switch is made to a third operating mode in which the at least one operational cylinder, during the course of a charge exchange, is closed later at the inlet side in order to expel a part of the cylinder fresh charge introduced during the course of the charge exchange. At 440, method 400 further includes determining whether a load on the engine falls below the fourth threshold. If the engine falls below the predetermined third threshold but exceeds the predetermined fourth threshold, at 442, method 400 includes during the partial deactivation closing an inlet valve later during charge exchange to expel part of a cylinder fresh charge responsive to the load falling below a third threshold that is lower than the second threshold.

The third operating mode provides for the cylinder that is operational even during partial deactivation of the internal combustion engine to be operated in accordance with the Atkinson cycle. In this case, a part of the charge air of the cylinder fresh charge is expelled into the intake system again, whereby thermal efficiency can be increased. The later the at least one operational cylinder is closed at the inlet side, the more charge air is expelled again by the piston of the cylinder during the compression process. In this way, the method includes operating the engine in a third operating mode by adjusting an inlet valve to close later during charge exchange to expel part of a cylinder fresh charge responsive to the load falling below a third threshold. In some instance, the exhaust gas recirculated externally may be reduced responsive to the load falling below the third threshold Here, embodiments of the method are advantageous in which the at least one operational cylinder, during the course of the charge exchange, is closed at the inlet side 15° CA to 70° CA after charge exchange bottom dead center. Here, embodiments of the method are also advantageous in which the at least one operational cylinder, during the course of the charge exchange, is closed at the inlet side 20° CA to 50° CA after charge exchange bottom dead center. During the switch into the third operating mode, embodiments of the method are advantageous in which, during the switch from the second operating mode to the third operating mode, the external recirculation of exhaust gas is reduced or stopped entirely.

Embodiments of the method are advantageous in which, proceeding from the third operating mode of the at least one cylinder that is operational even during partial deactivation of the internal combustion engine, in the event of a further reduction in load and a fourth predefinable load $T_{down,4}$ being undershot, a switch is made to a fourth operating mode in which the at least one operational cylinder, during the course of a charge exchange, is closed earlier at the inlet side. In this way, the method further comprises during the partial deactivation closing the inlet valve earlier during charge exchange responsive to the load falling below a fourth threshold that is lower than the third threshold. Conversely, at 440, if the load on the engine exceeds the fourth threshold, method 400 includes closing the inlet valve earlier in the timing cycle. In this way, the method includes operating the engine in a fourth operating mode by adjusting the inlet valve to close earlier during the charge exchange responsive to the load falling below a fourth threshold. In this case, embodiments of the method are advantageous in which, in the fourth operating mode, exhaust gas is circulated externally. However, in this connection, embodiments of the method are also advantageous in which, in the fourth operating mode, exhaust gas is circulated internally, wherein exhaust gas is recirculated internally by allowing an exhaust valve to remain open during the charge exchange.

In this case, embodiments of the method are advantageous in which the at least one operational cylinder, during the course of a charge exchange, is opened at the outlet side at least twice in order to effect internal recirculation of exhaust gas. Said differently, the method further comprises opening the exhaust valve at least twice during the charge exchange. Embodiments of the method are advantageous in which, during partial deactivation, the at least one deactivated cylinder of the second group is not opened at the inlet side and/or at the outlet side during the course of a charge exchange. If the supply of charge air to the deactivated cylinders is reduced or stopped entirely during partial deactivation, the charge exchange losses of the deactivated cylinders may be reduced. The reduced charge-air flow, or the prevention of a charge-air flow, through the at least one deactivated cylinder leads to reduced heat transfer owing to convection, such that the deactivated cylinders do not cool down, or cool down to a lesser extent, during the partial deactivation. This has advantages in particular with regard to pollutant emissions, in particular with regard to the emissions of unburned hydrocarbons, because the deactivated cylinders reach or exhibit their operating temperature again immediately after the end of the partial deactivation. In some instances, the method may further include closing one or more of the inlet valve and exhaust valve within the second group of switchable cylinders, wherein one or more of the inlet valve and exhaust valve of the second switchable cylinder remains closed during the partial deactivation.

Method variants are advantageous in which, for the purposes of supplying fuel to a cylinder, fuel is introduced by means of a direct injection. The fuel supply can be deactivated more quickly and more reliably, for the purposes of partial deactivation, in the case of direct-injection internal combustion engines than in the case of internal combustion engines with intake pipe injection, in which fuel residues in the intake pipe can lead to undesired combustions in the deactivated cylinder. Method variants may nevertheless be advantageous in which an intake pipe injection means is performed for the purposes of supplying fuel. Method variants are advantageous in which the fuel supply to the at least one switchable cylinder is deactivated in the event of deactivation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a turbocharged engine, comprising:
powering the engine using a first operating cylinder with a first valve overlap,
supplementing the power using a second switchable cylinder, the second switchable cylinder switched based on load and providing a partial deactivation, the second switchable cylinder being deactivated responsive to a load below a first threshold and activated responsive to the load exceeding the first threshold, closing a shut-off valve downstream of a compressor during the partial deactivation;

opening a second shut-off valve in a bypass line during the partial deactivation;

increasing valve overlap of the first operating cylinder relative to the first valve overlap to scavenge out residual gas therein;

actuating an inlet valve of the first operating cylinder to provide a valve lift before top dead center during charge exchange, wherein an exhaust gas is recirculated externally during operations; and reducing the valve overlap of the first operating cylinder relative to the first valve overlap during the partial deactivation responsive to the load falling below a second threshold that is lower than the first threshold.

2. The method of claim 1, further comprising, during the partial deactivation, closing the inlet valve at a first time during the charge exchange to expel part of a cylinder fresh charge responsive to the load falling below a third threshold that is lower than the second threshold.

3. The method of claim 2, wherein the inlet valve is closed in a range of 15° CA to 70° CA after charge exchange bottom dead center.

4. The method of claim 2, wherein the exhaust gas recirculated externally is reduced responsive to the load falling below the third threshold.

5. The method of claim 4, further comprising, during the partial deactivation, closing the inlet valve at a second time earlier than the first time during the charge exchange responsive to the load falling below a fourth threshold that is lower than the third threshold.

6. The method of claim 5, wherein exhaust gas is recirculated internally by allowing an exhaust valve to remain open during the charge exchange.

7. The method of claim 6, further comprising opening the exhaust valve at least twice during the charge exchange.

8. The method of claim 7, wherein one or more of an inlet valve and an exhaust valve of the second switchable cylinder remains closed during the partial deactivation.

9. A method for optimizing partial load operations in an engine with cylinders configured for deactivation, comprising:

operating the engine in a first operating mode with a first valve overlap by powering the engine with a first group of operating cylinders and supplementing the power with a second group of switchable cylinders, the second group of switchable cylinders being deactivated responsive to a load below a first threshold and activated responsive to the load exceeding the first threshold, and wherein the method includes closing a shut-off valve downstream of a compressor during the deactivation; and operating the engine in a second operating mode with exhaust gas recirculation, responsive to the load falling below a second threshold that is lower than the first threshold, by reducing valve overlap of the first group of operating cylinders relative to the first valve overlap.

10. The method of claim 9, further comprising operating the engine in a third operating mode by adjusting an inlet valve to close at a first timing during charge exchange, the first timing later than a timing at which the inlet valve is closed during engine operation in the first operating mode and a timing at which the inlet valve is closed during engine operation in the second operating mode, to expel part of a cylinder fresh charge responsive to the load falling below a third threshold that is lower than the second threshold.

11. The method of claim 10, further comprising operating the engine in a fourth operating mode by adjusting the inlet valve to close earlier during the charge exchange responsive to the load falling below a fourth threshold that is lower than the third threshold.

* * * * *